US007295212B2

(12) United States Patent
Farinelli

(10) Patent No.: US 7,295,212 B2
(45) Date of Patent: Nov. 13, 2007

(54) METHOD, SYSTEM, AND COMPUTER PROGRAM PRODUCT FOR BLENDING TEXTURES IN A TEXTURE PAGING SCHEME

(75) Inventor: Paolo Farinelli, Mountain View, CA (US)

(73) Assignee: Silicon Graphics, Inc., Sunnyvale, CA (US)

( * ) Notice: Subject to any disclaimer, the term of this patent is extended or adjusted under 35 U.S.C. 154(b) by 1 day.

(21) Appl. No.: 10/425,735

(22) Filed: Apr. 30, 2003

(65) Prior Publication Data

US 2004/0012604 A1    Jan. 22, 2004

Related U.S. Application Data

(63) Continuation-in-part of application No. 10/183,553, filed on Jun. 28, 2002, now Pat. No. 6,809,739.

(60) Provisional application No. 60/376,223, filed on Apr. 30, 2002.

(51) Int. Cl.
*G09G 5/00* (2006.01)
*G09G 5/02* (2006.01)

(52) U.S. Cl. .................. 345/587; 345/592

(58) Field of Classification Search ............. 345/587, 345/582, 592
See application file for complete search history.

(56) References Cited

U.S. PATENT DOCUMENTS

| 6,108,007 | A | 8/2000 | Shochet ................ 345/586 |
|---|---|---|---|
| 6,115,049 | A | 9/2000 | Winner et al. ............. 345/611 |
| 6,157,386 | A | 12/2000 | Wilde .................... 345/587 |
| 6,259,462 | B1 | 7/2001 | Gruber et al. ............. 345/561 |
| 6,292,193 | B1 * | 9/2001 | Perry et al. ............. 345/582 |
| 6,333,744 | B1 | 12/2001 | Kirk et al. ............... 345/506 |
| 6,356,273 | B1 | 3/2002 | Posniewski et al. ....... 345/587 |
| 6,373,482 | B1 | 4/2002 | Migdel et al. ............ 345/419 |
| 6,392,655 | B1 | 5/2002 | Migdal et al. ............. 345/582 |
| 6,486,887 | B1 * | 11/2002 | Lewis ..................... 345/587 |
| 6,693,634 | B1 * | 2/2004 | Mitsushita ................ 345/428 |
| 6,707,458 | B1 | 3/2004 | Leather et al. ............ 345/582 |
| 6,891,546 | B1 * | 5/2005 | Park et al. ................ 345/552 |

\* cited by examiner

*Primary Examiner*—Kee M. Tung
*Assistant Examiner*—Aaron M. Richer
(74) *Attorney, Agent, or Firm*—Sterne, Kessler, Goldstein & Fox P.L.L.C.

(57) ABSTRACT

Methods, systems, and computer program products for blending textures used to render computer generated images are provided. In an embodiment of the invention, a MIP-mapped mask texture is constructed. Each MIP-level of the MIP-mapped mask texture includes texels representative of different mask information. The MIP-mapped mask texture is sampled during rendering to obtain mask information. The obtained mask information is used to blend between textures. The invention is used to blend, for example, between multiple textures wherein, zero, one, or more of the textures are MIP-mapped and/or between different levels of one or more three-dimensional textures. In an embodiment, the most appropriate texture amongst multiple textures, each providing coverage at different resolutions, is selected for a fragment being rendered, thereby avoiding texture scintillation.

30 Claims, 8 Drawing Sheets

METHOD, SYSTEM, AND COMPUTER PROGRAM PRODUCT FOR BLENDING TEXTURES IN A TEXTURE PAGING SCHEME

CROSS REFERENCE TO RELATED APPLICATIONS

This application is a continuation-in-part of commonly owned U.S. application Ser. No. 10/183,553, filed Jun. 28, 2002, now U.S. Pat. No. 6,809,739, and this application claims the benefit of U.S. Provisional Application No. 60/376,223, filed Apr. 30, 2002, each of which is incorporated herein by reference in its entirety.

FIELD OF THE INVENTION

The invention relates to computer graphics. More particularly, it relates to rendering of a computer generated image.

BACKGROUND OF THE INVENTION

Computer systems are used to render all kinds of images for display. In general, it is important that images rendered for display appear as realistic to a viewer as possible. It is also important in many applications that the computer system used to render images for display operate at an interactive rate.

Many computer systems used to render images for display have graphics processors. Graphics processors allow for flexibility in the configuration of the per-pixel computation stage of their graphics rendering pipeline. This makes it possible, for example, to implement at interactive rates complex algorithms for combining, blending, and/or modulating multiple textures in a single pass through the graphics rendering pipeline.

Using a graphics processor, it is possible, for example, to perform a per-fragment texture selection based on spatial mask-information encoded in an additional texture. This is particularly useful in a terrain texture paging scheme, where multiple textures (each providing coverage for a contiguous subregion of the terrain) need to be spatially selected on a per-fragment basis during rendering of a single primitive. U.S. application Ser. No. 10/183,553, which is incorporated by reference herein in its entirety, describes how a mask texture containing properly encoded information on the spatial coverage of various textures can be sampled to obtain a per-fragment mask value.

While techniques for blending textures exists, these techniques have limitations. For example, the blending techniques that exist select textures based on spatial availability information. There are situations, however, where selecting textures based only on spatial availability information will result in the selection of the textures providing coverage at the highest available resolution for each fragment. These situations include, for example, implementations where the available textures (or a subset of them) are not MIP-mapped, and where some regions of terrain imagery are present in more than one texture at different resolutions. Because, in these situations, the selected textures of higher resolution are not MIP-mapped, their usage over areas of the terrain whose area projected to screen-space is small will cause visible aliasing problems or texture scintillation.

What is needed is a texture selection scheme and blending technique that do not exhibit texture scintillation for the situations described above.

BRIEF SUMMARY OF THE INVENTION

The present invention provides a method, system, and computer program product for blending textures used to render images. In an embodiment, the present invention involves constructing a MIP-mapped mask texture, wherein each MIP-level of the MIP-mapped mask texture includes texels representative of different mask information, sampling the MIP-mapped mask texture to obtain mask information, and using the mask information obtained to blend between textures.

In an embodiment of the present invention, multiple textures of progressively higher resolution provide coverage for concentric square regions of a terrain. Textures of progressively higher resolution provide coverage, for example, at four-times the resolution (two-times width, two-times height) of preceding textures. In this way, the area covered by one texture is also covered by other textures with a lower resolution, and a single texture provides full coverage for areas covered by textures with a higher resolution. Then, by appropriately biasing the MIP-level selection computation for the MIP-mapped mask texture, each MIP-level in the MIP-mapped mask texture is set to correspond to the resolution provided by the textures. Textures providing coverage for fragments at a resolution closest to the resolution associated with the MIP-level of the mask selected by the graphics processor unit, are favored over textures of higher resolution that also provide coverage for fragments being rendered.

In an embodiment of the present invention, the present invention selects the most appropriate texture amongst multiple textures, each providing coverage at different resolutions, for a fragment being rendered.

In an embodiment of the present invention, the MIP-mapped mask texture is constructed from integer values. In another embodiment, the MIP-mapped mask texture is constructed from floating-point values.

In an embodiment of the present invention, the mask information obtained from the MIP-mapped mask texture is a point sample value. In another embodiment, the mask information obtained from the MIP-mapped mask texture a filtered value such as, for example, a bi-linearly filtered sample, a tri-linearly filtered sample, or an anisotropicly filtered sample.

It is a feature of the present invention that the MIP-mapped mask texture can be constructed from many different types of values. For example, in an embodiment, the MIP-mapped mask texture is constructed from single component values. In other embodiments, the MIP-mapped mask texture is constructed, for example, from two component values, three component values, or four component values.

It is also a feature of the present invention that it can be used to blend many different types of textures. For example, the present invention can be used to blend between multiple textures wherein, zero, one, or more of the textures are MIP-mapped. The present invention can also be used, for example, to blend between different levels of one or more three-dimensional textures. Other embodiments of the present invention blend between still other types of textures.

Further features and advantages of the present invention, as well as the structure and operation of various embodiments of the present invention, are described in detail below with reference to the accompanying drawings.

BRIEF DESCRIPTION OF THE DRAWINGS/FIGURES

The present invention is described with reference to the accompanying figures. In the figures, like reference numbers indicate identical or functionally similar elements. Additionally, the leftmost digit or digits of a reference number identify the figure in which the reference number first appears. The accompanying figures, which are incorporated herein and form part of the specification, illustrate the present invention and, together with the description, further serve to explain the principles of the invention and to enable a person skilled in the relevant art to make and use the invention.

DETAILED DESCRIPTION OF THE INVENTION

Figure 1:
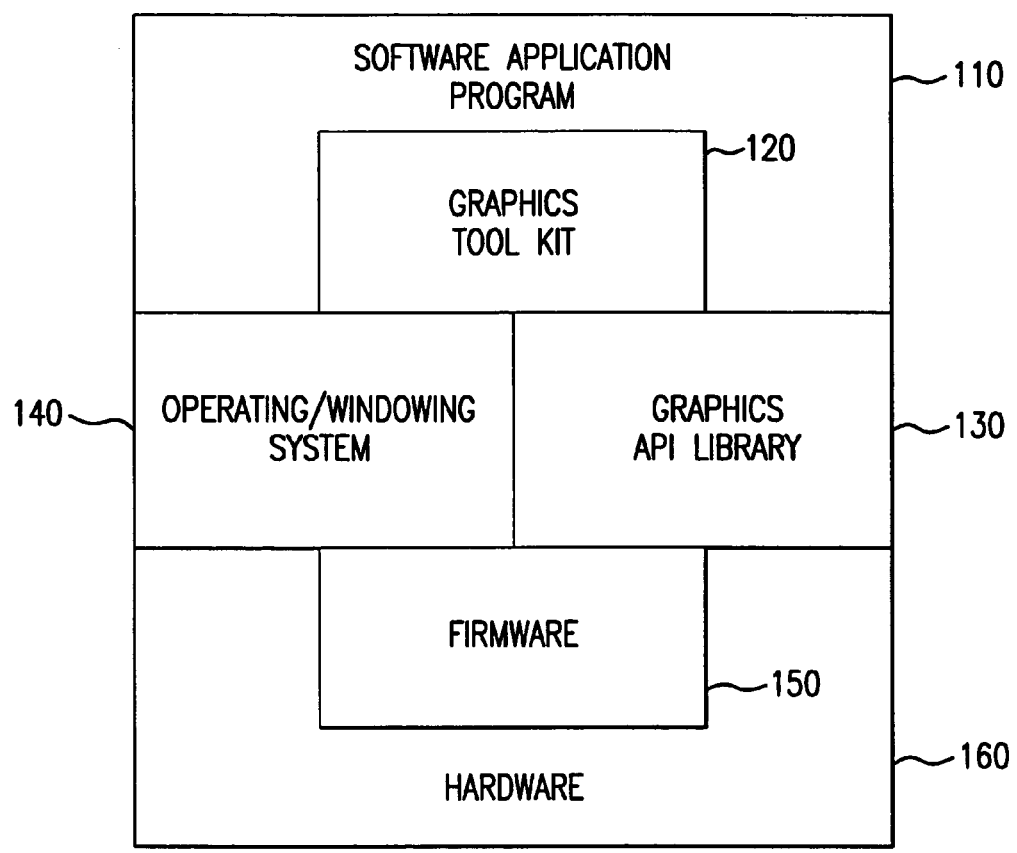
FIG. 1 illustrates an example architecture in which the present invention can be implemented.

As described herein, the present invention provides a method, a system, and a computer program product for blending textures used to render images. The detailed description of the present invention that follows begins with a terminology subsection that defines terms used to describe the present invention. This subsection is followed by subsections that describe in detail various embodiments of the present invention. Finally, this section concludes by describing a computer system that can be used to implement, for example, system and computer program product embodiments of the present invention.

Terminology

The following terms are defined so that they may be used to describe embodiments of the present invention. As used herein:

"Clip texture emulation scheme" means a texture paging scheme that emulates the hardware clip-texturing of INFINITE REALITY graphics systems, available from Silicon Graphics, Incorporated, Mountain View, Calif. This hardware supports, for example, displaying textures that are too large to fit in available graphics processor memory or system memory.

"Fragment" means an image point and its associated information such as color, depth, and texture data.

"Image" means an array of data values. A typical image might have red, green, blue, and/or alpha pixel data, or other types of pixel data information as known to a person skilled in the relevant art.

"Mask" or "Mask Texture" means an array of values used to blend between textures. Typically, values of a mask or mask texture are used as weighting factors associated with particular texels blended together to form a texel.

"MIP-mapped mask texture" means a data structure, formed from textures, from which mask information or mask values can be obtained. This data structure is similar to a conventional MIP-mapped data structure. Different levels of a MIP-mapped mask texture include different mask information. This different mask information can be used to select among different resolution textures. Such a MIP-mapped mask texture can be stored in any type of layout in any type of memory.

"Pixel" means a data structure, which is used to represent a picture element. Any type of pixel format can be used.

"Real-time" or "Interactive Rate" refers to a rate at which successive display images can be redrawn without undue delay upon a user or application. This can include, but is not limited to, a nominal rate of between 30-60 frames/second. In some example embodiments, such as some flight simulators or some interactive computer games, an interactive rate maybe approximately 10 frames/second. In some examples, real-time can be one update per second.

"Texture" means an array of texels. A texel can be a color or an intensity value. A texture can be any array of values that is used to determine a value for a pixel. As used herein, the term "texture" includes, for example, texture maps, bump maps, and gloss maps. A texture can also be used as mask information to blend or to combine other textures.

"Texel" means a texture element.

"Texture sample" means a sample selected from a texture map or texture. The sample can represent one texel value or can be formed from two or more texel values blended together. Different weighting factors can be used for each texel blended together to form a texel. The terms "texel" and "texture sample" are sometimes used interchangeably.

"Texture unit" refers to graphics hardware, firmware, and/or software that can be used to obtain a texture sample (e.g., a point sample or a filtered texture sample) from a texture. A texture unit can in some instances obtain multiple texture samples from multiple textures.

EXAMPLE ARCHITECTURE AND ENVIRONMENT OF THE PRESENT INVENTION

FIG. 1 illustrates a block diagram of an example computer architecture 100 in which the various features of the present invention can be implemented. It is an advantage of the invention that it may be implemented in many different ways, in many environments, and on many different computers or computer systems. As described herein, the present invention is very flexible. It is particularly useful for blending or selecting textures used to render images in a texture paging scheme or a clip texture emulation scheme.

Architecture 100 includes six overlapping layers. Layer 110 represents a high level software application program. Layer 120 represents a three-dimensional (3D) graphics software tool kit, such as OPENGL PERFORMER, available from Silicon Graphics, Incorporated. Layer 130 represents a graphics application programming interface (API), which can include but is not limited to OPENGL, available from Silicon Graphics, Incorporated. Layer 140 represents system support such as operating system and/or windowing system support. Layer 150 represents firmware. Finally, layer 160 represents hardware, including graphics hardware. Hardware 160 can be any hardware or graphics hardware including, but not limited to, a computer graphics processor (single chip or multiple chip), a specially designed computer, an interactive graphics machine, a gaming platform, a low end game system, a game console, a network architecture, et cetera. Some or all of the layers 110-160 of architecture 100 will be available in most commercially available computers.

As will be apparent to a person skilled in the relevant art after reading the description of the invention herein, various features of the invention can be implemented in any one of the layers 110-160 of architecture 100, or in any combination of layers 110-160 of architecture 100.

In an embodiment, the invention is used to blend multiple textures in a dynamic texture paging scheme. The textures that are blended according to this embodiment provide coverage for different areas of a larger (virtual) image at potentially different resolutions. In an embodiment, the blended textures cover overlapping areas of a larger (virtual) image.

Figure 2:
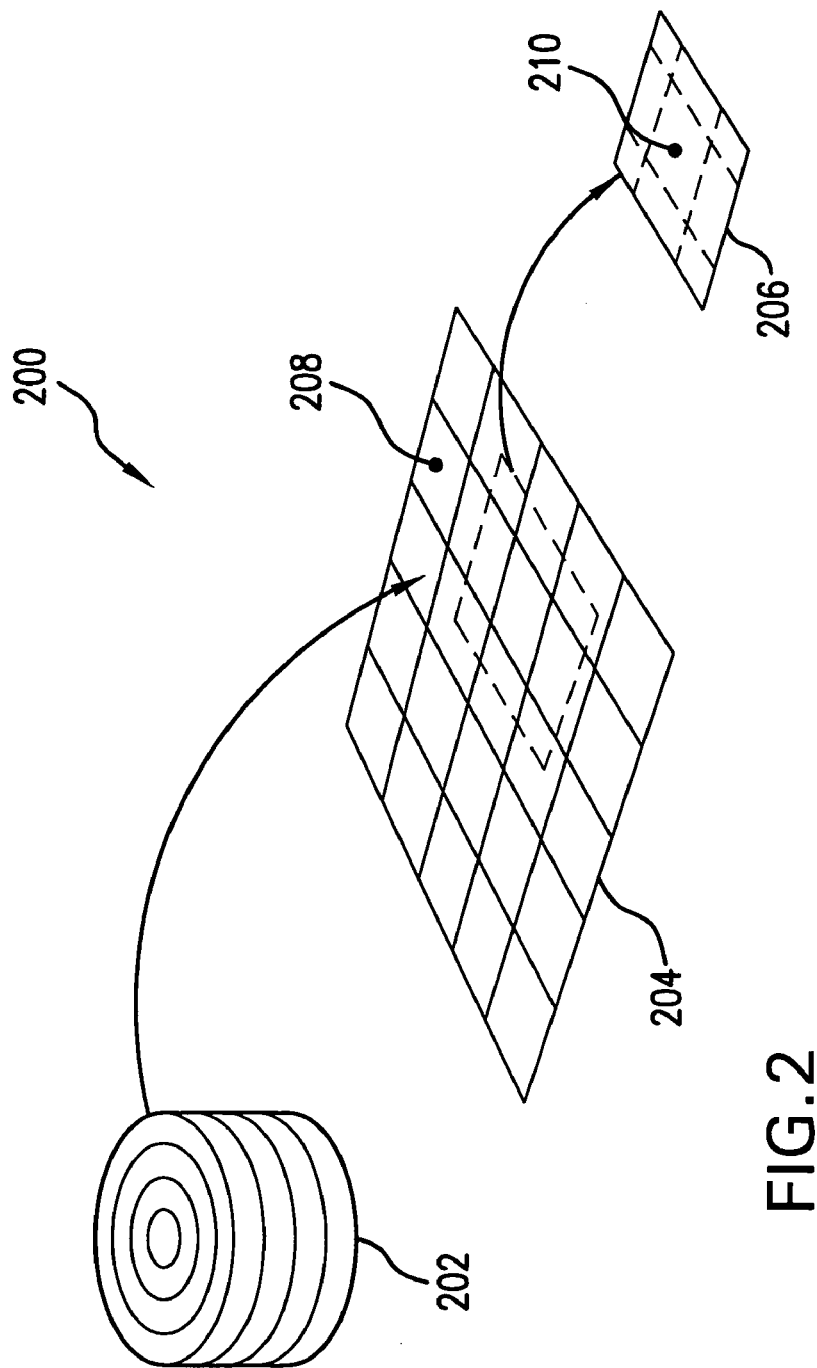
FIG. 2 illustrates an example texture paging scheme.

FIG. 2 illustrates an example texture paging scheme 200 that is compatible with the present invention. As shown in FIG. 2, texture paging scheme 200 involves moving texture from a system storage device 202 to a system memory 204, and from system memory 204 to a texture memory 206. A similar scheme is utilized for each clipped level. System storage device 202 can be any suitable storage device such as, for example, computer disks. System memory 204 is made up of many different memory regions 208. Each memory region 208 is capable of storing a texture region (e.g., a portion of a texture) or a page of texture. Typically, texture memory 206 is capable of holding more than a single page of texture as illustrated by page of texture 210.

As can be seen in FIG. 2, texture paging scheme 200 creates boundaries between the pages of texture or texture regions stored in system memory 204 and texture memory 206. In an embodiment, the present invention is used to blend different pages of texture or texture regions using mask information obtained from a MIP-mapped mask texture.

In an embodiment, the invention is used to blend multiple roaming levels in a clip texture emulation scheme. These roaming levels may be consecutive roaming levels or non-consecutive roaming levels. As will be understood by a person skilled in the relevant art given the description herein, two consecutive roaming level textures comprise two independent textures of equal size representing two concentric subregions of a larger (virtual) image. One of the two roaming level textures covers, for example, four times the area covered by the other roaming level texture, but at one-fourth the resolution.

In another embodiment, the consecutive levels being blended may be non-roaming levels or a mixture of roaming levels and non-roaming levels.

In yet another embodiment, the levels being blended can be different levels of a three-dimensional texture or different levels of multiple three-dimensional textures.

Figure 3:
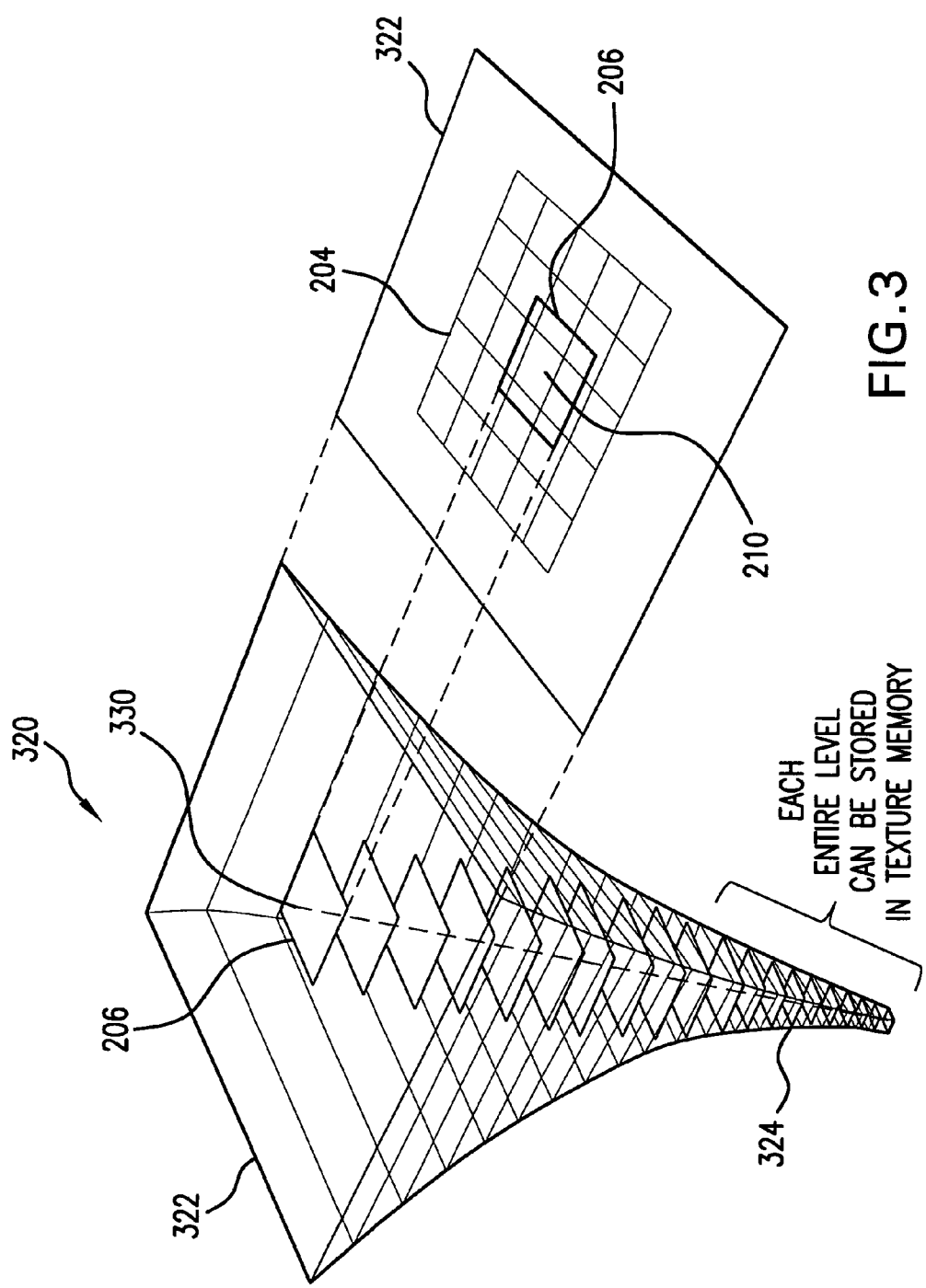
FIG. 3 illustrates an example clip texture.

FIG. 3 illustrates an example clip texture 320 that can be used in a clip texture emulation scheme that is compatible with the present invention. Clip texture 320 includes a plurality of MIP-levels. A MIP-level may be too large such as, for example, level 322 to fit into texture memory 206. Such levels are commonly referred to as roaming levels 330. The portion of a MIP level that can be stored in texture memory is called a clip region and/or clipped texture. On the other hand, some MIP-levels of clip texture 320 may fit completely into texture memory 206, as illustrated by MIP-level 324. These levels are referred to as pyramid levels and/or non-roaming levels. It is a feature of the present invention that it can be used to blend texture regions of roaming levels and/or non-roaming levels in a clip texture emulation scheme.

Taken together, the plurality of roaming levels 330 make up a "clip stack." The clip stack is essentially a partial MIPMAP that is dynamically updated. Highest resolution texture data is available only around a particular point in MIP-level 322. This particular point is called the "clip center." By repositioning the clip center and managing the off-disk texture loading and caching, the present invention enables one skilled in the relevant arts to dynamically roam over and zoom in and out of huge textured regions, thereby facilitating, for example, unconstrained viewing of high resolution imagery at real-time rates without texture scintillation.

EXAMPLE SYSTEM EMBODIMENT OF THE PRESENT INVENTION

Figure 4:
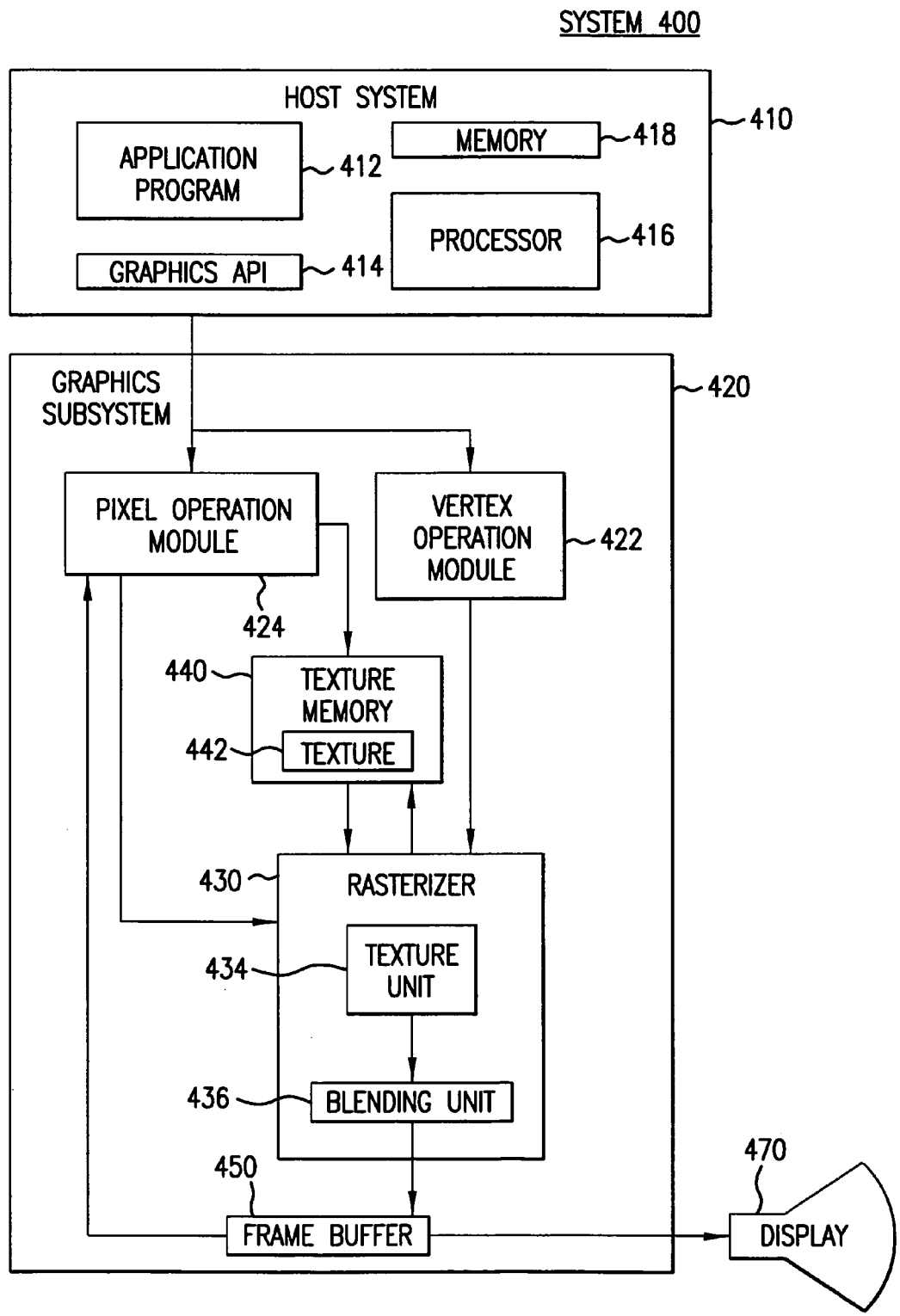
FIG. 4 illustrates an example system embodiment of the present invention.

FIG. 4 illustrates an example graphics system 400 according to an embodiment of the present invention. Graphics system 400 includes a host system 410, a graphics subsystem 420, and a display 470. As described herein, graphics system 400 can be used to implement the method and computer program product embodiments of the present invention. The method and computer program product embodiments of the present invention, however, are not limited to being implemented using graphics system 400.

Host system 410 includes an application program 412, a hardware interface or graphics API 414, a processor 416, and a memory 418. Application program 412 is any program requiring the rendering of a computer image. The computer code of application program 412 is executed by processor 416. Application program 412 assesses the features of graphics subsystem 420 and display 470 through hardware interface or graphics API 414. Memory 418 stores information used by application program 412.

Graphics subsystem 420 includes a vertex operation module 422, a pixel operation module 424, a rasterizer 430, a texture memory 440, and a frame buffer 450. Texture memory 440 can store one or more textures or images, such as texture 442. Texture memory 440 is connected to a texture unit 434 by a bus (not shown). Rasterizer 430 includes a texture unit 434 and a blending unit 436. Texture unit 434 and blending unit 436 can be implemented separately or together as part of a graphics processor. The operation of these features of graphics system 400 would be known to a person skilled in the relevant art given the description herein.

In embodiments of the present invention, texture unit 434 can obtain multiple point samples or multiple filtered samples from textures and/or images stored in texture memory 440, including a MIP-mapped mask texture according to the present invention. Blending unit 436 blends texels and/or pixel values according to weighting values to produce a fragment, texel, or pixel. These weight values can include values of zero. The output of texture unit 438 and/or blending unit 436 is stored in frame buffer 450. Display 470 can be used to display images stored in frame buffer 450.

The embodiment of the invention shown in FIG. 4 has a multipass graphics pipeline. It is capable of operating on each pixel of an image (object) during each pass that the image makes through the graphics pipeline. For each pixel of the image, during each pass that the image makes through the graphics pipeline, texture unit 434 can obtain at least one texture sample from the textures and/or images stored in texture memory 440.

Further features and advantages of graphics system 400 will be understood by persons skilled in the relevant arts given the description of the present invention herein.

EXAMPLE METHOD EMBODIMENT OF THE PRESENT INVENTION

Figure 5:
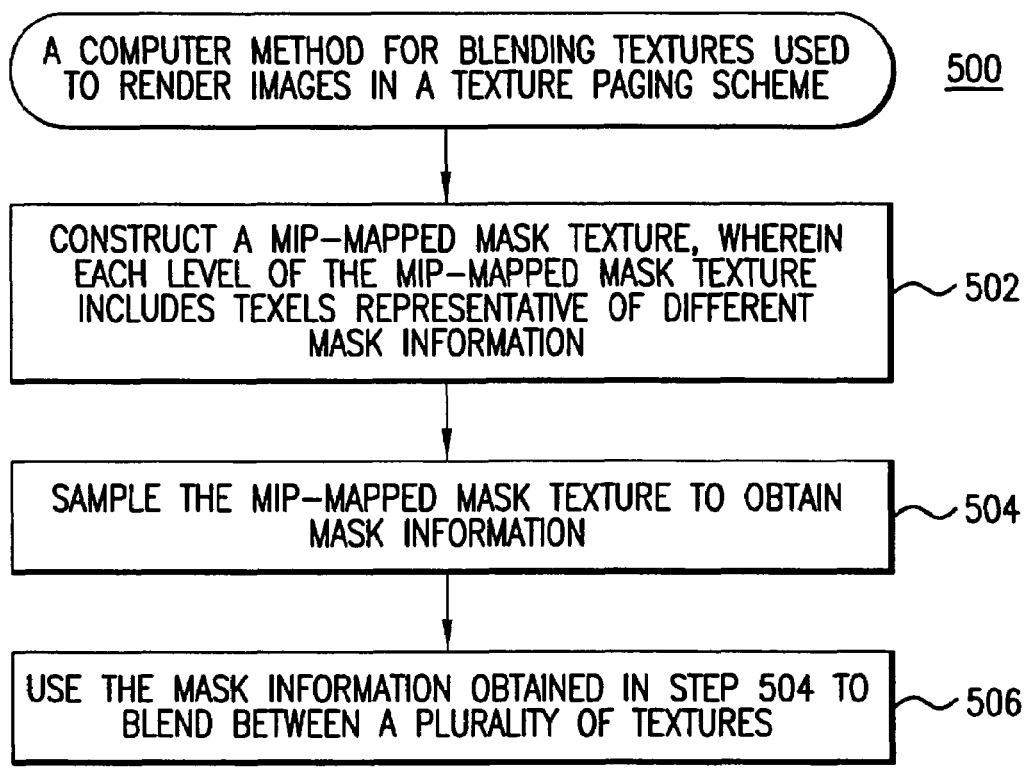
FIG. 5 illustrates a flowchart of the steps of a method embodiment of the invention.

FIG. 5 is a flowchart of the steps of a method 500 for blending textures used to render computer generated images according to an embodiment of the invention. As illustrated in FIG. 5, method 500 comprises three steps 502, 504, and 506. In step 502, a MIP-mapped mask texture is constructed, wherein each level of the MIP-mapped mask texture includes texels representative of different mask information. In step 504, the MIP-mapped mask texture is sampled to obtain mask information. In step 506, the mask information obtained in step 504 is used to blend between a plurality of textures.

Figure 6:
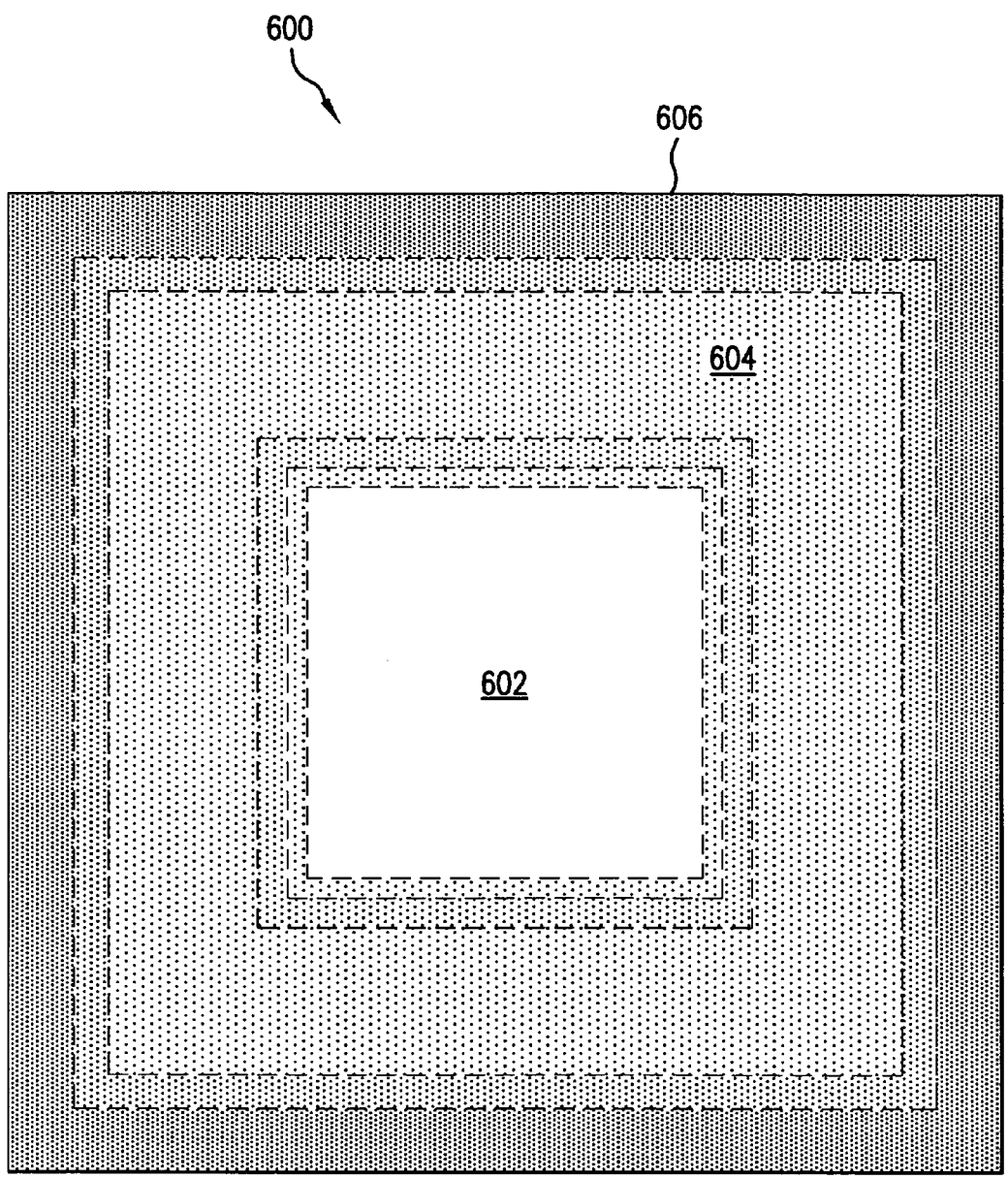
FIG. 6 illustrates a texture used to blend between consecutive roaming levels in a clip texture emulation scheme according to an embodiment of the invention.
Figure 7:
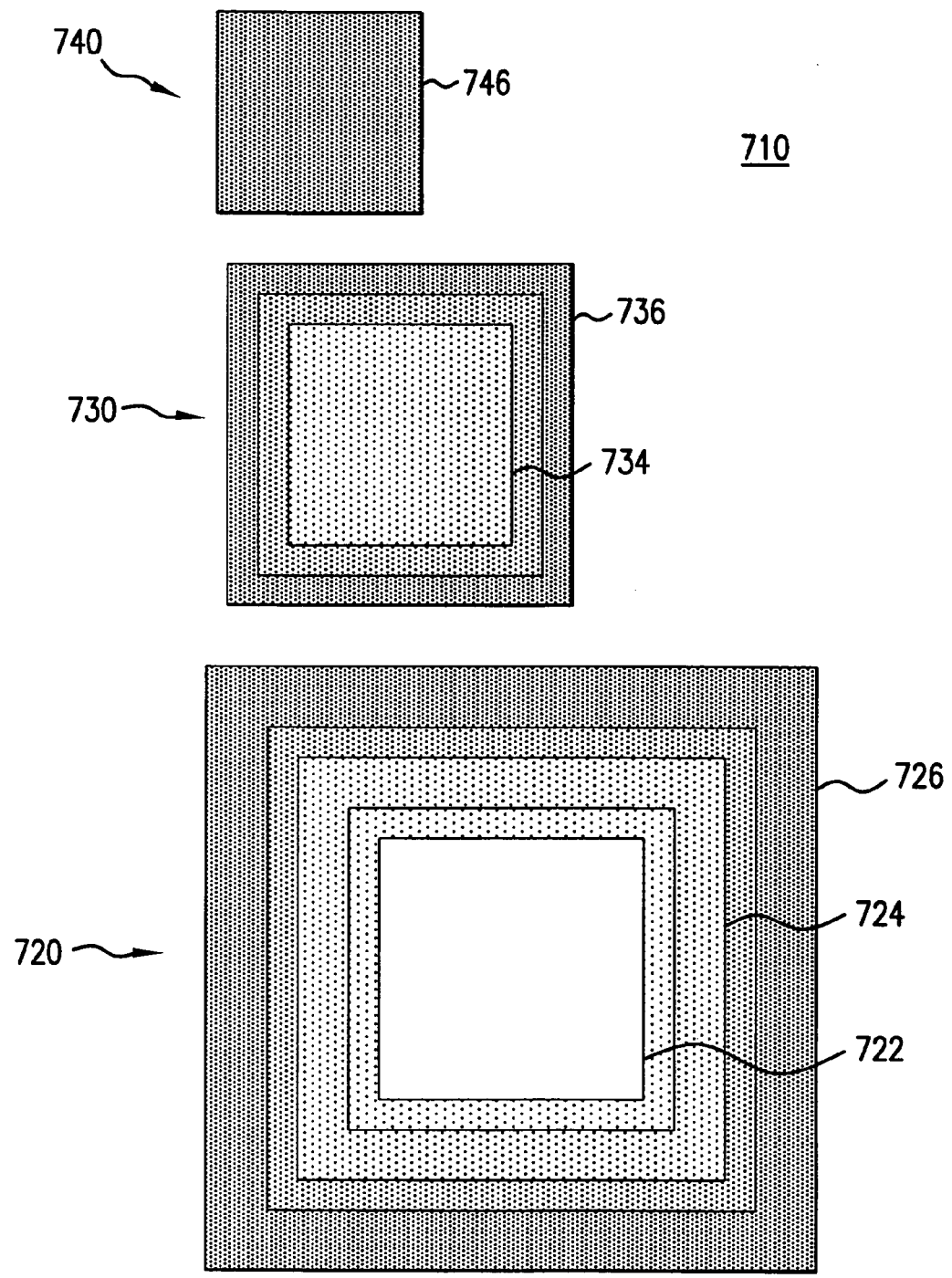
FIG. 7 illustrates an example MIP-mapped mask texture according to an embodiment of the invention.

As noted above, in step 502 a MIP-mapped mask texture is constructed that includes a plurality of mask textures such as, for example, a mask texture 600 illustrated in FIG. 6. An example MIP-mapped mask texture 710 is shown in FIG. 7. Mask texture 600 and MIP-mapped mask texture 710 are further described below with reference to FIG. 6 and FIG. 7.

As illustrated in FIG. 7, each MIP-level of a MIP-mapped mask texture according to the present invention includes texels representative of different mask information. The structure of a MIP-mapped mask texture according to the present invention is similar to a conventional MIP-mapped data structure.

In an embodiment of the invention, the MIP-mapped mask texture is constructed from a plurality of single component values. In other embodiments, the MIP-mapped mask texture is constructed, for example, from a plurality of two component values, three component values, or four component values. Each of these values can be either an integer value or a floating-point value.

In step 504, the MIP-mapped mask texture constructed in step 502 is sampled to obtain mask information. In an embodiment of the present invention, the mask information obtained from the MIP-mapped mask texture is a point sample value. In another embodiment, the mask information obtained from the MIP-mapped mask texture is a filtered value such as, for example, a bi-linearly filtered sample, a tri-linearly filtered sample, or an anisotropicly filtered sample. It is an advantage of the present invention that these values can be obtained using the processing capabilities of available graphics processors.

In step 504, the texture coordinates of the geometry may have to be modified before they are used to sample the mask texture. In an embodiment, this is accomplished by linearly transforming the texture coordinates of the geometry so that the current coordinates of the clip center are mapped to (0.5, 0.5). The coordinates are also scaled so that the regions in the mask texture are accurately mapped over the regions of the terrain for which textures in the clip stack provide coverage. The highest resolution MIP-level of the mask encodes the maximum available resolution for each fragment.

In an embodiment, the MIP-level selection of the mask texture is biased as follows. Assume, for example, that M×M is the size of the smallest region encoded in the mask texture, and T×T is the size of each texture in the clip stack, then the MIP selection is biased by log (T/M). The result of sampling the mask with this bias is used to compute the correct MIP-level selection for the clip stack, or more precisely, the minimum between the available resolution and the correct MIP-level resolution for every pixel.

In step 506, the mask information obtained in step 504 is used to blend between a plurality of textures. In an embodiment, this is accomplished as follows. First, the mask information obtained in step 504 is used to calculate coefficients that represent blending weights. Next, these blending weights are associated with texture samples obtained from available textures. Finally, the blending weights are used with their associated texture samples in a summation operation to produce fragments, texels, and/or pixels. How this is accomplished will be understood by persons skilled in the relevant arts given the description herein.

In an embodiment, the present invention selects the most appropriate texture amongst multiple textures, each providing coverage at different resolutions, for a fragment being rendered. This is accomplished, for example, by assigning a blending weight of zero to any texture samples obtained from a texture other than the most appropriate texture.

In an embodiment, the present invention is used to blend between multiple textures of progressively higher resolution. These multiple textures provide coverage, for example, for concentric square regions of a terrain. The textures of progressively higher resolution provide coverage at four-times the resolution (two-times width, two-times height) of preceding textures. In this way, the area covered by one texture is also covered by other textures with a lower resolution, and a single texture provides full coverage for areas covered by textures with a higher resolution.

It is a feature of the present invention that it can be used to blend many different types of textures. For example, the present invention can be used to blend between multiple textures wherein, zero, one, or more of the textures are MIP-mapped. The present invention can also be used, for example, to blend between different levels of one or more three-dimensional textures. Other embodiments of the present invention blend between still other types of textures.

FIG. 6 illustrates an example mask texture 600 according to an embodiment of the invention that can be used, for example, to blend consecutive roaming level textures in a clip texture emulation scheme. As shown in FIG. 6, mask texture 600 has a white square region 602, a gray square region 604, and a black square region 606. The values in white square region 602 are equal to 1.0. The values in the gray square region 604 are equal to 0.5. The values in the black square region are equal to 0.0. The region between white square region 602 and gray square region 604 contains values between 1.0 and 0.5. The region between gray square region 604 and black square region 606 contains values between 0.5 and 0.0.

As described in U.S. application Ser. No. 10/183,553, the values of mask texture 600 can be extracted and used to form masks. These masks are used, for example, to blend between any three consecutive roaming level textures (e.g., a high resolution texture, a medium resolution texture, and a low resolution texture) and form a blended image. A mask value of 1.0 indicates that a fragment value from the high resolution texture is used to form the blended image. A mask value between 1.0 and 0.5 indicates that a linear blend between the high resolution texture and the medium resolution texture is used. A mask value of 0.5 indicates that a fragment value from the medium resolution texture is used to form the blended image. A mask value between 0.5 and 0.0 indicates that a linear blend between the medium resolution texture and the low resolution texture is used. Finally, a mask value of 0.0 indicates that a fragment value from the low resolution texture is used to form the blended image. In an embodiment, the low resolution texture is a base texture.

Mask texture 600 is only illustrative, and it is not intended to limit the invention. Other textures according to the invention have non-square regions and more or fewer regions than that of mask texture 600.

FIG. 7 illustrates an example MIP-mapped mask texture 710 according to the present invention. As shown in FIG. 7, MIP-mapped mask texture 710 has three MIP-levels 720, 730, and 740. MIP-mapped mask texture 710 can be used, for example, in accordance with method 500 to blend between three roaming levels in a clip texture emulation scheme according to an embodiment of the invention. MIP-mapped mask texture 710 is only illustrative, and it is not intended to limit the invention.

MIP level 720 has a white square region 722, a gray square region 724, and a black square region 726. The values in the white square region 722 are equal to 1.0. The values in the gray square region 724 are equal to 0.5. The values in the black square region 726 are equal to 0.0. The region between white square region 722 and gray square region 724 contains values between 1.0 and 0.5. The region between gray square region 724 and black square region 726 contains values between 0.5 and 0.0.

MIP level 730 has a gray square region 734 and a black square region 736. The values in the gray square region 734 are equal to 0.5. The values in the black square region 736 are equal to 0.0. The region between gray square region 734 and black square region 736 contains values between 0.5 and 0.0.

MIP level 740 has a black square region 746. The values in the black square region 746 are equal to 0.0.

In an embodiment, the values of MIP-mapped mask texture 710 are used as mask information to select and/or blend between three roaming level textures (e.g., a high resolution texture, a medium resolution texture, and a low resolution texture) as described herein. A mask value of 1.0 indicates that a fragment value from a high resolution texture is used. A mask value between 1.0 and 0.5 indicates that a linear blend between the high resolution texture and a medium resolution texture is used to form a fragment value. A mask value of 0.5 indicates that a fragment value from the medium resolution texture is used. A mask value between 0.5 and 0.0 indicates that a linear blend between the medium resolution texture and a low resolution texture is used to form a fragment value. Finally, a mask value of 0.0 indicates that a fragment value from the low resolution texture is used.

EXAMPLE COMPUTER SYSTEM FOR IMPLEMENTING EMBODIMENTS OF THE PRESENT INVENTION

Figure 8:
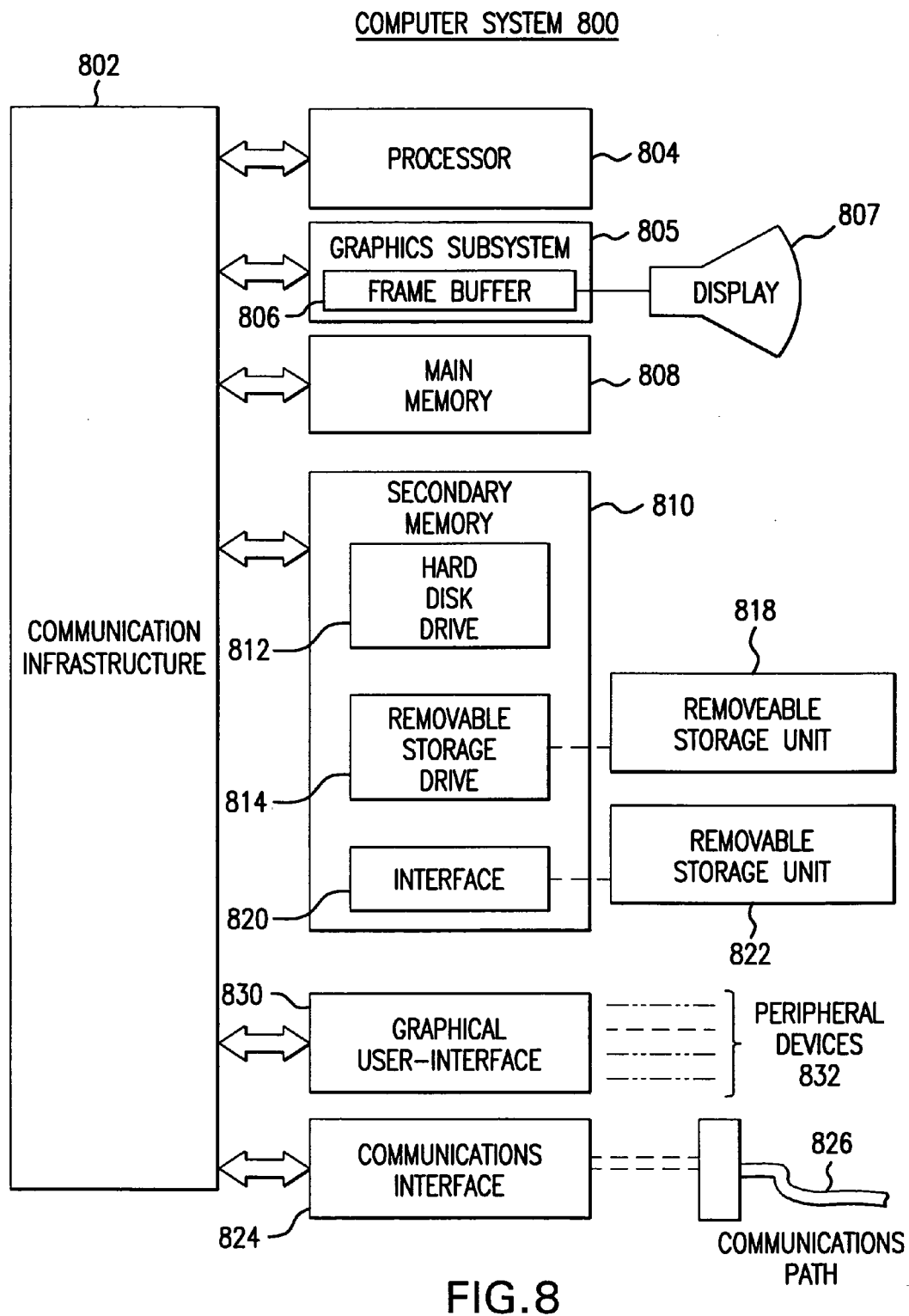
FIG. 8 illustrates an example computer system that can be used to implement embodiments of the present invention.

FIG. 8 illustrates an example of a computer system 800 that can be used to implement system and/or computer program product embodiments of the present invention. This example computer system is illustrative and not intended to limit the present invention. Computer system 800 represents any single or multi-processor computer. Single-threaded and multi-threaded computers can be used. Unified or distributed memory systems can be used.

Computer system 800 includes one or more processors, such as processor 804, and one or more graphics subsystems, such as graphics subsystem 805. One or more processors 804 and one or more graphics subsystems 805 can execute software and implement all or part of the features of the present invention described herein. Graphics subsystem 805 can be implemented, for example, on a single chip as a part of processor 804, or it can be implemented on one or more separate chips located on a graphic board. Each processor 804 is connected to a communication infrastructure 802 (e.g., a communications bus, cross-bar, or network). After reading this description, it will become apparent to a person skilled in the relevant art how to implement the invention using other computer systems and/or computer architectures.

Computer system 800 also includes a main memory 808, preferably random access memory (RAM), and can also include secondary memory 810. Secondary memory 810 can include, for example, a hard disk drive 812 and/or a removable storage drive 814, representing a floppy disk drive, a magnetic tape drive, an optical disk drive, etc. The removable storage drive 814 reads from and/or writes to a removable storage unit 818 in a well-known manner. Removable storage unit 818 represents a floppy disk, magnetic tape, optical disk, etc., which is read by and written to by removable storage drive 814. As will be appreciated, the removable storage unit 818 includes a computer usable storage medium having stored therein computer software and/or data.

In alternative embodiments, secondary memory 810 may include other similar means for allowing computer programs or other instructions to be loaded into computer system 800. Such means can include, for example, a removable storage unit 822 and an interface 820. Examples can include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to computer system 800.

In an embodiment, computer system 800 includes a frame buffer 806 and a display 807. Frame buffer 806 is in electrical communication with graphics subsystem 805. Images stored in frame buffer 806 can be viewed using display 807.

Computer system 800 can also include a communications interface 824. Communications interface 824 allows software and data to be transferred between computer system 800 and external devices via communications path 826. Examples of communications interface 824 can include a modem, a network interface (such as Ethernet card), a communications port, etc. Software and data transferred via communications interface 824 are in the form of signals which can be electronic, electromagnetic, optical or other signals capable of being received by communications interface 824, via communications path 826. Note that communications interface 824 provides a means by which computer system 800 can interface to a network such as the Internet.

Computer system 800 can include one or more peripheral devices 832, which are coupled to communications infrastructure 802 by graphical user-interface 830. Example peripheral devices 832, which can from a part of computer system 800, include, for example, a keyboard, a pointing device (e.g., a mouse), a joystick, and a game pad. Other peripheral devices 832, which can form a part of computer system 800 will be known to a person skilled in the relevant art given the description herein.

The present invention can be implemented using software running (that is, executing) in an environment similar to that described above with respect to FIG. 7. In this document, the term "computer program product" is used to generally refer to removable storage unit 818, a hard disk installed in hard disk drive 812, or a carrier wave or other signal carrying software over a communication path 826 (wireless link or cable) to communication interface 824. A computer useable medium can include magnetic media, optical media, or other recordable media, or media that transmits a carrier wave. These computer program products are means for providing software to computer system 800.

Computer programs (also called computer control logic) are stored in main memory 808 and/or secondary memory 810. Computer programs can also be received via communications interface 824. Such computer programs, when executed, enable the computer system 800 to perform the features of the present invention as discussed herein. In particular, the computer programs, when executed, enable the processor 804 to perform the features of the present invention. Accordingly, such computer programs represent controllers of the computer system 800.

In an embodiment where the invention is implemented using software, the software may be stored in a computer program product and loaded into computer system 800 using removable storage drive 814, hard drive 812, or communications interface 824. Alternatively, the computer program product may be downloaded to computer system 800 over communications path 826. The control logic (software), when executed by the one or more processors 804, causes the processor(s) 804 to perform the functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to a person skilled in the relevant art.

CONCLUSION

Various embodiments of the present invention have been described above, which are capable of being implemented on an interactive graphics machine. It should be understood that these embodiments have been presented by way of example only, and not limitation. It will be understood by those skilled in the relevant art that various changes in form and details of the embodiments described above may be made without departing from the spirit and scope of the present invention as defined in the claims. Thus, the breadth and scope of the present invention should not be limited by any of the above-described exemplary embodiments, but should be defined only in accordance with the following claims and their equivalents.

What is claimed is:

1. A computer method for blending texture maps used to render images, comprising:
   (1) constructing a MIP-mapped mask texture, wherein each level of the MIP-mapped mask texture includes texels representative of different mask information;
   (2) sampling the MIP-mapped mask texture to obtain mask information; and
   (3) using the mask information obtained in step (2) to blend the texture maps;
   wherein at least one level of the MIP-mapped mask texture has different regions that correspond to different degrees of resolution and the MIP-mapped mask texture is different from the texture maps.

2. The method of claim 1, wherein step (1) further comprises:
   constructing the MIP-mapped mask texture from a plurality of single component values.

3. The method of claim 1, wherein step (1) further comprises:
   constructing the MIP-mapped mask texture from a plurality of two component values.

4. The method of claim 1, wherein step (1) further comprises:
   constructing the MIP-mapped mask texture from a plurality of three component values.

5. The method of claim 1, wherein step (1) further comprises:
   constructing the MIP-mapped mask texture from a plurality of four component values.

6. The method of claim 1, wherein step (1) further comprises:
   constructing the MIP-mapped mask texture from a plurality of integer values.

7. The method of claim 1, wherein step (1) further comprises:
   constructing the MIP-mapped mask texture from a plurality of floating-point values.

8. The method of claim 1, wherein the mask information obtained from the MIP-mapped mask texture in step (2) is a point sample value.

9. The method of claim 1, wherein the mask information obtained from the MIP-mapped mask texture in step (2) is a filtered value.

10. The method of claim 1, wherein step (3) further comprises:
    blending a first texture map and a second texture map.

11. The method of claim 10, wherein the first texture map is MIP-mapped.

12. The method of claim 11, wherein the second texture map is MIP-mapped.

13. The method of claim 1, wherein step (3) further comprises:
    blending a first level and a second level of a three-dimensional texture map.

14. A computer program product for enabling a computer to blend texture maps used to render images, said computer program product comprising a computer useable medium having computer program logic recorded thereon for controlling a processor, said computer program logic comprising:
    a procedure that enables a computer to construct a MIP-mapped mask texture, wherein each level of the MIP-mapped mask texture includes texels representative of different mask information;
    a procedure that enables the computer to sample the MIP-mapped mask texture to obtain mask information; and
    a procedure that enables the computer to use the mask information to blend the texture maps;
    wherein at least one level of the MIP-mapped mask texture has different regions that correspond to different degrees of resolution and the MIP-mapped mask texture is different from the texture maps.

15. The computer program product of claim 14, wherein the procedure that enables the computer to construct the MIP-mapped mask texture enables the computer to construct the MIP-mapped mask texture from a plurality of single component values.

16. The computer program product of claim 14, wherein the procedure that enables the computer to construct the MIP-mapped mask texture enables the computer to construct the MIP-mapped mask texture from a plurality of two component values.

17. The computer program product of claim 14, wherein the procedure that enables the computer to construct the MIP-mapped mask texture enables the computer to construct the MIP-mapped mask texture from a plurality of three component values.

18. The computer program product of claim 14, wherein the procedure that enables the computer to construct the MIP-mapped mask texture enables the computer to construct the MIP-mapped mask texture from a plurality of four component values.

19. The computer program product of claim 14, wherein the procedure that enables the computer to construct the MIP-mapped mask texture enables the computer to construct the MIP-mapped mask texture from a plurality of integer values.

20. The computer program product of claim 14, wherein the procedure that enables the computer to construct the MIP-mapped mask texture enables the computer to construct the MIP-mapped mask texture from a plurality of floating-point values.

21. The computer program product of claim 14, wherein the procedure that enables the computer to sample the MIP-mapped mask texture enables the computer to obtain from the MIP-mapped mask texture a point sample value.

22. The computer program product of claim 14, wherein the procedure that enables the computer to sample the MIP-mapped mask texture enables the computer to obtain from the MIP-mapped mask texture a filtered value.

23. The computer program product of claim 14, wherein the procedure that enables the computer to use the mask information to blend a plurality of texture maps enables the computer to blend between a first texture map and a second texture map.

24. The computer program product of claim 23, wherein the first texture map is MIP-mapped.

25. The computer program product of claim 24, wherein the second texture map is MIP-mapped.

26. The computer program product of claim 14, wherein the procedure that enables the computer to use the mask information to blend a plurality of texture maps enables the computer to blend a first level and a second level of a three-dimensional texture map.

27. A computer system for blending texture maps used to render images, comprising:
a processor;
means for enabling said processor to construct a MIP-mapped mask texture, wherein each level of the MIP-mapped mask texture includes texels representative of different mask information;
means for enabling said processor to sample the MIP-mapped mask texture to obtain mask information; and
means for enabling said processor to use the mask information to blend the texture maps;
wherein at least one level of the MIP-mapped mask texture has different regions that correspond to different degrees of resolution and the MIP-mapped mask texture is different from the texture maps.

28. The method of claim 1, wherein the different regions include a first region and a second region, the mask information in the first region corresponds to a first degree of resolution, the mask information in the second region corresponds to a second degree of resolution, and the first degree of resolution is different from the second degree resolution.

29. The computer program product of claim 14, wherein the different regions include a first region and a second region, the mask information in the first region corresponds to a first degree of resolution, the mask information in the second region corresponds to a second degree of resolution, and the first degree of resolution is different from the second degree resolution.

30. The computer system of claim 27, wherein the different regions include a first region and a second region, the mask information in the first region corresponds to a first degree of resolution, the mask information in the second region corresponds to a second degree of resolution, and the first degree of resolution is different from the second degree resolution.

* * * * *